United States Patent Office 3,219,281
Patented Nov. 23, 1965

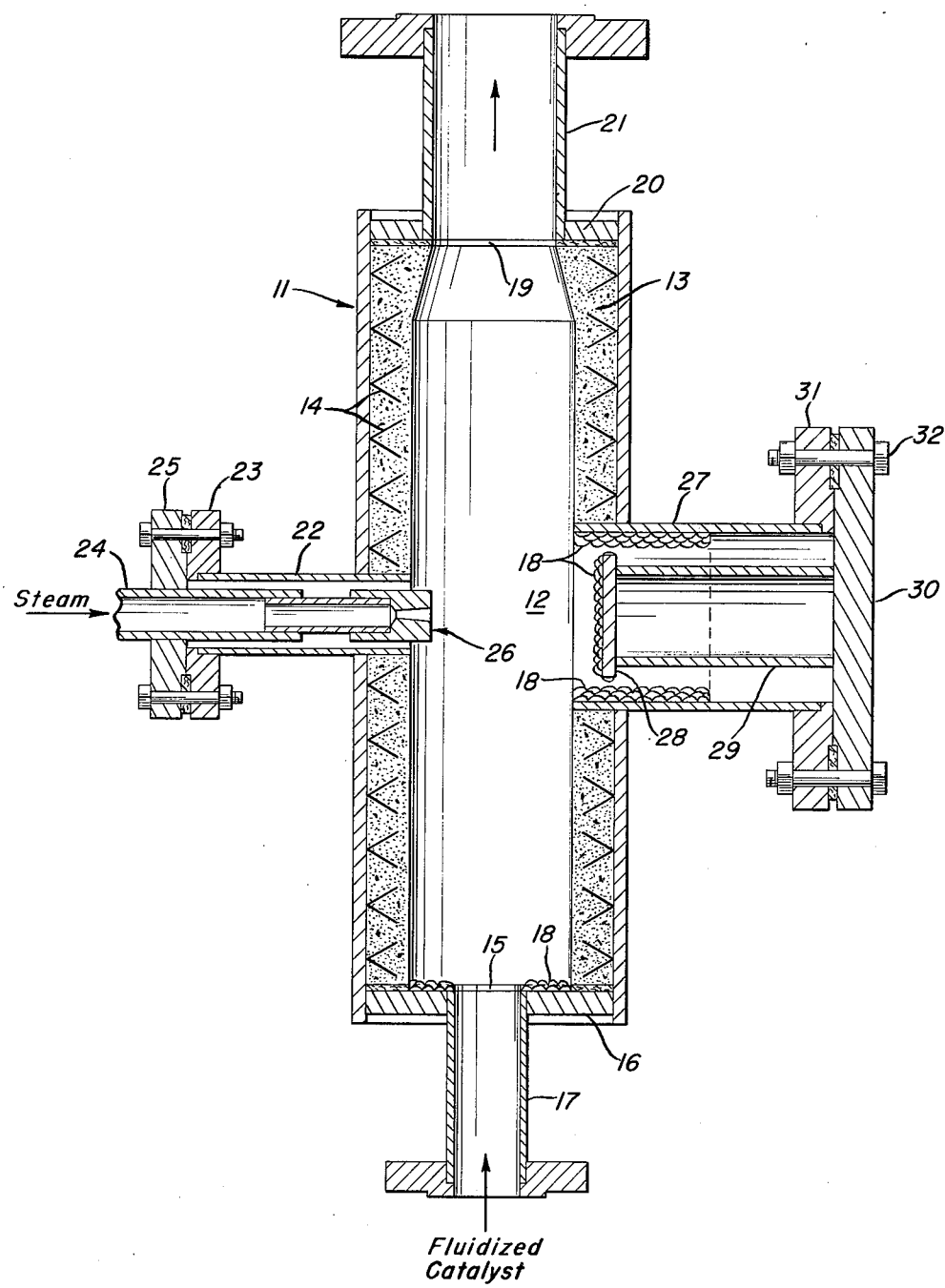

3,219,281
METHOD AND APPARATUS FOR SUBDIVIDING PARTICULATE SOLIDS
Howard P. Jasper and Robert J. Kreuz, Mandan, N. Dak., assignors to Standard Oil Company, Chicago, Ill., a corporation of Indiana
Filed July 8, 1963, Ser. No. 293,527
5 Claims. (Cl. 241—5)

This invention relates to the subdivision of particulate solids. More particularly, it relates to a method and apparatus for reducing the particle size of finely divided solid catalyst to improve the particle size distribution of such catalyst.

Particulate solids are used in many chemical processes, and especially in catalytic conversion processes. A principal process for the catalytic conversion of petroleum is the fluidized catalyst process. Briefly, in this process finely divided solid catalyst, commonly referred to as powdered catalyst, is suspended in vaporized petroleum oil to form a stream of suspended catalyst in the petroleum vapors, the stream is then introduced into a reactor wherein catalytic reactions occur such as cracking, the catalyst is separated from the vaporous products and introduced into another gaseous fluid for transport to a regenerator wherein carbon deposits are burned from the catalyst, and the regenerated catalyst reintroduced into stream of petroleum vapors. In the normal circulation of the catalyst throughout the process there is an uneven attrition of the individual catalyst particles with consequent production of a broad spectrum of catalyst particle size, ranging from very fine to very course materials. Due to the nature of the process, the very fine materials are lost from the fluidized catalyst system and consequently leave behind the coarse particles. Efficient operation of the fluidized solids process is dependent upon the amount of fines and coarse material produced during operation of such fluidized catalyst systems. While the desirable removal of metal-contaminated catalyst is effected through loss of the very fine material from the system, the retention of the coarser material impairs the fluidization of the catalyst and reduces the efficiency of the catalytic conversion operation. Consequently, it is highly desirable to maintain a balance between the very fine material and the coarser material in the circulating catalyst mixture. The coarser material referred to embraces the catalyst particles having a particle size of 75+ microns. Maximum operating efficiency is obtained when the major proportion of the fluidized catalyst is of a particle size of less than about 75 microns. Prior art techniques for effecting the physical separation of the coarser materials from the catalyst mixture by conventional separation techniques, such as elutriation, is uneconomical due to the large volume of finely divided solid catalyst used in fluidized catalyst cracking processes and subsequent reduction in size of the coarse particles. Consequently, it is highly desirable to have a simple and economical method and means for reducing the particle size of 75+ microns catalyst particles in a catalyst mixture without prior separation of the coarser particles from the mixture.

An object of the invention is to provide an improved method for reducing the particle size of particulate solids. Another object of the invention is to provide apparatus for reducing the particle size of particulate solids. A further object of the invention is to provide an improved method and apparatus for reducing the particle size of finely divided solid catalyst suspended in a fluid flowing in an enclosed conduit under super-atmospheric conditions. Additional objects will be apparent to one skilled in the art.

The method of the invention generally comprises entraining particulate solids consisting of a mixture of particles of varying particle size in a carrier gas flowing under super-atmospheric pressure conditions in an enclosed conduit to form a stream of fluidized solids, continuously passing said stream through an impact zone wherein a high-velocity stream of a gaseous fluid is introduced perpendicularly to the flow of said first stream through said zone to impart a transverse velocity to said solids in said first stream, which transverse velocity is greater than the flow velocity of said solids, and thereby cause said solids to strike a hard surface in said zone and thereby reduce the particle size of said solids in said flowing stream. The term "fluidized solids" as used herein refers to a suspension of particulate solids in a carrier gas or a gaseous fluid.

One appropriate apparatus which can be employed inter alia, in the practice of the method of the invention is represented in the drawing. The specific structural embodiment as illustrated in longitudinal cross-section in the drawing includes a fluid-tight tubular member 11 which provides an elongated cylindrical impact zone 12 through which the stream of fluidized solids passes. The inner wall of member 11 is lined with a dense refractory material 13 and secured thereto by brackets 14 to provide a low erodable surface in said impact zone 12. An inlet opening 15 of reduced diameter provided in end closure 16, which is provided with a flanged pipe 17 for connection to a conduit, not shown, for introducing the stream of fluidized solids to member 11. The internal surface of end 16 is provided with hard wear-resistant material 18, such as Stellite, tungsten carbide, etc., to minimize erosion. An outlet opening 19 is provided in end closure 19 which is provided with a flanged discharge pipe 21 for connection to a conduit, not shown, for removing the stream of fluidized solids from member 11. Opening 19 as a diameter greater than inlet opening 15 but less than internal diameter of member 11. In the apparatus shown, the tubular member 11 may appropriately to about 18 inches long and about 6 inches in diameter, although members of other lengths and diameters may be employed; inlet and outlet pipes 17 and 21 may be about 1.5 and 3 inches in diameter, respectively; and refractory lining 13 may be about 1 inch in thickness. End closures 16 and 20 may be secured to member 11 by welding or other conventional means not shown.

Connected to the side wall of member 11 is a perpendicular pipe 22 provided with flange 23. Pipe 22 extends through wall of member 11 and lining 13 to zone 12 to provide an opening for a steam inlet means. Disposed in pipe 22 is steam line 24 which is attached by bolted flange 25 to flange 23. Steam line 24 is provided at its outlet with sonic nozzle 26 for discharging a high velocity stream of steam into impact zone 12.

A pipe 27 is mounted in the wall of tubular member 11 opposite pipe 22 and extending through lining 13 to zone 12. Disposed in the opening provided by pipe 27 is a hard plate 28 which is supported on pipe 29 attached to mounting flange 30 secured to flange 31 by bolts 32. Plate 28 which is disposed opposite sonic nozzle 26 provides an impingement surface against which the stream introduced through sonic nozzle 26 and the solids in the stream of fluidized solids passing through member 11 impinge and thereby reduce the particle size of said solids. The surface of plate 28 opposite nozzle 26 and the adjacent internal surface of pipe 27 are also provided with hard wear-resistant material 18 to minimize erosion thereof.

From the structure described hereinabove, the apparatus and method of the invention for reducing the particle size of particulate solids will be understood by reference to a specific embodiment of the invention.

A flowing stream of fluidized catalyst from an enclosed conduit, operating at a pressure of from about 15 to about 22 p.s.i.g., not shown, is continuously introduced through pipe 17 and opening 15 to impact zone 12 of tubular member 11 and continuously withdrawn from said impact zone 12 through opening 19 and outlet pipe 21 in communication with said enclosed conduit. Concurrently with the passage of said stream of fluidized catalyst through said member 11 high pressure steam is perpendicularly injected from line 24 through nozzle 26 into said stream in impact zone 12. Steam at a pressure of about 125 p.s.i.g thus injected produces a high velocity, calculated at 2400 ft./sec., stream of steam in a transverse direction to the direction of flow of said stream of fluidized catalyst in zone 12. The high velocity stream thus imparts a transverse direction to the individual catalyst particles in the fluidized catalyst stream. The steam and solid catalyst particles then impinge on the hard surface plate 28 on the side opposite the steam nozzle thus causing the solid catalyst particles to break up. The catalyst load in the stream of fluidized catalyst passing through impact zone 12 was at a rate of about 2 tons/hour in air flowing at a velocity of about 20–40 ft./sec. at about 300° F. The injected steam rate was about 500 pounds/hour.

The effect upon the catalyst size distribution in the stream of fluidized catalyst during passage through impact zone 12 is shown in the following table wherein average particle size values from 3 sets of inlet and outlet catalyst samples as measured by micromesh sieves is presented:

| Size Range, microns | Percent Distribution | |
|---|---|---|
| | Inlet Catalyst | Outlet Catalyst |
| 0-20 | 0.1 | 0.4 |
| 20-30 | 0.5 | 2.7 |
| 30-45 | 6.4 | 18.7 |
| 45-60 | 33.1 | 50.9 |
| 60-75 | 35.1 | 21.6 |
| 75-90 | 15.3 | 4.2 |
| 90+ | 9.5 | 1.5 |

The above data show the effectivenes of the treatment of a flowing stream of fluidized catalyst in accordance with the present invention to improve the catalyst size distribution. It will be noted that the percentage of catalyst particles having a particle size above 75 microns was significantly reduced in accordance with the present invention. A further improvement is obtained in the percentage of particles in the 30–60 micron size range. The aforesaid treatment thus produces finely divided solid catalyst of desired particle size and a minimum of coarse material.

It will be apparent to one skilled in the art that the present invention provides a simple and inexpensive method and apparatus for use therein for reducing the particle size and improving the distribution thereof of particulate solids. The invention is particularly appropriate for use in fluidized solids petroleum cracking processes to produce catalyst particles in the desired particle size range.

The invention claimed is:

1. The method for reducing the percentage of finely divided solid catalyst having a particle size greater than about 75 microns in a flowing confined stream of said catalyst suspended in a gaseous fluid which comprises: introducing finely divided solid catalyst into a flowing gaseous fluid at elevated pressure to form a flowing confined stream of fluidized catalyst; continuously passing said stream through a confined fluid-tight impact zone; introducing a stream of high-velocity steam perpendicular to and into said confined stream in said zone to impart a transverse velocity to said catalyst, which transverse velocity is greater than the flow velocity of said catalyst flowing through said zone, to cause said catalyst to strike a wear-resistant hard surface in said zone and thereby reduce the particle size of said catalyst; and continuously removing from said zone a confined stream of fluidized catalyst, said stream containing a lesser percentage of catalyst having a particle size greater than about 75 microns than in the confined stream introduced into said zone.

2. The method for reducing the particle size of finely divided solid catalyst in a stream of fluidized catalyst flowing in an enclosed conduit at elevated pressure which comprises: entraining finely divided solid catalyst in a carrier gas at an elevated pressure to form a confined flowing stream of fluidized catalyst; continuously passing said stream through a confined impact zone wherein super-atmospheric pressure steam is continuosuly injected into and in a perpendicular direction to the flow of said stream in said zone to impart a transverse velocity to said catalyst, which velocity in the transverse direction is greater than the flow velocity of said catalyst through said zone, to cause said catalyst to strike a wear-resistant hard surface and thereby reduce the particle size of said catalyst in said stream.

3. Apparatus for reducing the particle size of particulate solids suspended in a gaseous fluid being transported through an enclosed conduit at elevated pressure whereby a stream of fluidized solids comprising a major proportion of said solids having a particle size less than about 75 microns is obtained, comprising: a fluid-tight tubular member provided at one end with an inlet opening of an internal diameter less than the internal diameter of said member and at the end opposite said inlet opening with an outlet opening having an internal diameter greater than the diameter of said inlet opening and less than the internal diameter of said tubular member; inlet means in the wall of said tubular member comprising a sonic nozzle for introducing a second fluid and imparting high velocity to said second fluid, said nozzle having its longitudinal axis perpendicular to the longitudinal axis of said tubular member; and wear-resistant impingement means replaceably disposed in said tubular member in spaced apart relationship from and opposite to said second fluid inlet means.

4. Apparatus for reducing under super-atmospheric conditions the particle size of finely divided solid catalyst in a confined flowing stream of fluidized catalyst in an enclosed conduit comprising: a fluid-tight tubular member disposed in said conduit, said member having inlet and outlet openings in communication with said conduit, said inlet opening having its internal diameter less than the internal diameter of said member and said outlet opening being opposite said inlet opening in said member and having its internal diameter greater than the diameter of said inlet opening and less than the internal diameter of said tubular member; inlet means in said tubular member for introducing into said stream flowing through said member a high-velocity stream of steam perpendicularly to said stream flow; and impingement means comprising a hard material having a wear-resistant surface, said impingement means oppositely disposed from and in spaced apart relationshp from said steam inlet means in said tubular member.

5. Apparatus for reducing the particle size of finely divided solid catalyst suspended in a gaseous fluid and flowing as a confined fluidized catalyst stream in an enclosed conduit under super-atmospheric pressure conditions comprising: a fluid-tight conduit; means for introducing said stream into a first opening of said conduit; means for introducing steam into a second opening of said conduit, which opening is perpendicular to said first opening, to form a high velocity stream of steam in said conduit transverse to flow of said stream introduced into said first opening; impingement means replaceably disposed in a third opening of said conduit, which opening is opposite said second opening, said impingement means comprising a hard material having a wear-resistant surface; means for removing said catalyst stream from a fourth opening in said conduit, which opening is opposite said first opening.

References Cited by the Examiner

UNITED STATES PATENTS

| | | | |
|---|---|---|---|
| 1,847,009 | 2/1932 | Kollbohm | 241—40 |
| 2,768,938 | 10/1956 | Martin | 241—5 X |
| 3,058,674 | 10/1962 | Kocher | 241—5 X |

J. SPENCER OVERHOLSER, *Primary Examiner.*